United States Patent [19]

Thompson et al.

[11] Patent Number: 4,479,735
[45] Date of Patent: Oct. 30, 1984

[54] SHRINK FIT SLEEVE FOR ROTATING MACHINERY

[75] Inventors: Daniel G. Thompson, Pittsburgh; Siu-Kee Chan, Monroeville, both of Pa.

[73] Assignee: Westinghouse Electric Corp., Pittsburgh, Pa.

[21] Appl. No.: 457,787

[22] Filed: Jan. 13, 1983

[51] Int. Cl.³ .............................................. F16C 1/20
[52] U.S. Cl. ...................................... 403/28; 403/30; 403/372; 403/365; 416/244 R; 416/184
[58] Field of Search ............... 416/244 A, 244 R, 184, 416/199; 403/29, 28, 30, 372, 365; 415/122 R

[56] References Cited

U.S. PATENT DOCUMENTS

| | | |
|---|---|---|
| 3,019,039 | 1/1962 | Clavell . |
| 3,715,176 | 2/1973 | Kerlo .............................. 416/244 A |
| 3,776,653 | 12/1973 | Buzogany ........................... 403/372 |
| 3,787,141 | 1/1974 | Walsh ............................ 416/244 A |
| 3,838,928 | 10/1974 | Blaurock et al. ................... 403/372 |
| 4,147,468 | 4/1979 | Murakami ......................... 403/29 X |
| 4,218,186 | 8/1980 | Teager et al. ...................... 416/184 |

FOREIGN PATENT DOCUMENTS

| | | | |
|---|---|---|---|
| 2009366 | 6/1979 | United Kingdom ................ 403/337 |
| 523994 | 11/1976 | U.S.S.R. .......................... 416/244 A |
| 547569 | 5/1977 | U.S.S.R. ............................. 403/365 |

Primary Examiner—Thomas F. Callaghan
Assistant Examiner—Joseph A. Fischetti
Attorney, Agent, or Firm—E. C. Arenz

[57] ABSTRACT

Shrink fit sleeves 30 interposed between the hub 21 and the shaft 10 of a large rotating apparatus adapted for operation in an environment subject to severe cyclical loading as occasioned by large thermal transients, are provided with the property of having greater axial shear flexibility than radial flexibility and/or greater axial flexibility than that of the shrunk on component 21.

7 Claims, 7 Drawing Figures

PRIOR ART

SHRINK FIT SLEEVE FOR ROTATING MACHINERY

This invention pertains to the art of mounting a rotating element upon a rotating shaft in ways to avoid having the rotating element shift axially relative to the shaft and/or to reduce shrink-fit thermal stresses.

BACKGROUND OF THE INVENTION

Rotating machinery often includes components such as hubs of impellers, disks, or rings that are thermally shrunk on a circular shaft. When these shrunk-on components are subjected to severe cylic loading paths, such as can be induced by large changes in rotational speed and/or large thermal transients such as can occur with the start-up or shut down of high temperature, high speed machinery, such as with large induced draft hot gas fans used to handle combustion gases in a power plant, or gas or steam turbines, these shrunk-on components occasionally "ratchet" or "walk" up or down the shaft. The main reason for this is because of the differential expansion between the component and the shaft, due to large thermal transients for the most part. Thus, taking a centrifugal fan which is to handle hot combustion gases for example, as the fan is brought into service and begins at ambient temperature, the temperature of the fan wheel and hub increases faster than the temperature of the shaft upon which the hub is mounted. Then, when the fan is taken out of service, the wheel and hub temperature will decrease faster than that of the shaft. To the extent ratcheting occurs under these conditions, problems such as material fretting, unbalance, vibrations, and improper alignments arise.

Ratcheting has sometimes been viewed as an indication that the shrunk-on component had become loose (or nearly loose) sometime during a thermal transient. However, it has been concluded from analysis that ratcheting is caused by relative movement or slipping at the interface of the component and shaft, and that this ratcheting can occur even when the component is relatively tightly shrunk on throughout the thermal transient. In this connection it is noted that the degree of shrink fit is typically mathematically calculated to provide a sufficient radial force that the frictional force resisting expansion of the component relative to the shaft will at least equal or exceed the force arising from the coefficient of expansion with the contemplated elevated temperature of the component relative to the shaft.

It is the aim of this invention to provide arrangements for at least reducing the degree of ratcheting experienced in devices of the character noted before.

SUMMARY OF THE INVENTION

In accordance with the invention, a sleeve is provided between the shrink fit component and the shaft with the sleeve having flexibilities in various directions, and including shear flexibilities, to control the magnitudes of the stresses. In some cases the sleeve is made to be more flexible to axial shear stress at the contact interfaces with both the component and the shaft than the radial flexibility of the sleeve. In other cases the sleeve may be provided with greater flexibility in at least the axial direction than the flexibility that the outer component encompassing the sleeve has in the axial direction.

The invention can be carried out in several ways, including providing a particular geometry, or form, or shape of the sleeve, and in other cases by providing a material which is anisotropic with the desired different flexibilities arising through design.

DRAWING DESCRIPTION

DESCRIPTION OF THE PREFERRED EMBODIMENTS

Figure 1:
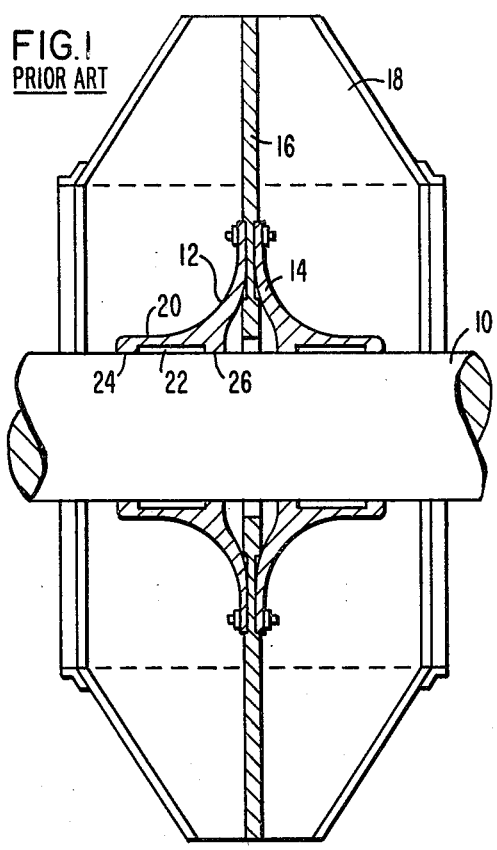
FIG. 1 is a partly broken view of a double width, double inlet centrifugal fan wheel of the type adapted to handle hot gases, and which will serve as an example of one device to which the invention can be applied.

Referring to FIG. 1, the centrifugal fan wheel is mounted onto the large rotary shaft 10 through two opposing hubs 12 and 14 which are heat shrunk directly onto the shaft in accordance with conventional prior art practice. The hub supports a disk-shaped wheel plate 16 having fan blades 18 secured thereto at its outer peripheral portion. While the wheel illustrated is of the double width, double inlet type, the invention would be also applicable to a single width, single inlet type fan in which only one of the hubs would be present and the center plate 16 would be the back plate.

In the particular wheel shown, the hub 12 includes an axially extending root portion 20 provided with a circumferential stress relief space 22 in its inner circumferential surface with opposite feet 24 and 26 at the opposite axial ends of the space 22.

In the manufacture of these wheels, the radial force between the feet 24 and 26 and the shaft 10 required to give adequate frictional force, with the determined thermal transient of the environment in which the wheel is to be operated, is calculated so that relative movement between the feet and shaft will not occur when the forces of differential expansion between the hub and shaft arise. The inner diameter of the feet at ambient is then determined relative to the outer diameter of the shaft. At ambient temperatures, this inner diameter will be less than the outer diameter of the shaft. Then, the shaft is cold soaked, while the hub is elevated enough in temperature that the circumferential expansion of the hub and the circumferential shrinking of the shaft permits the hub to be slipped onto the shaft for a shrink fit when the elements return to ambient temperature.

Figure 2:
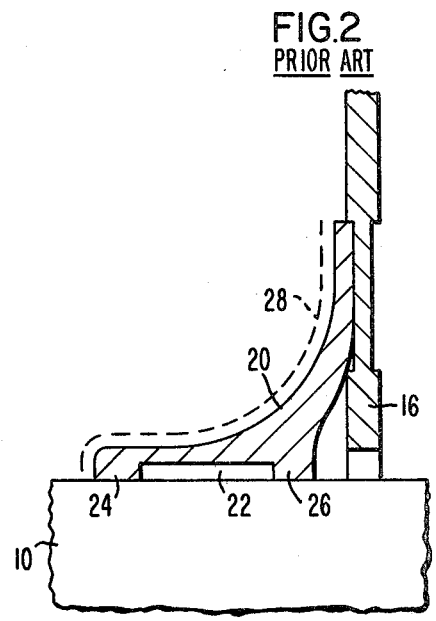
FIG. 2 is a fragmentary view of a portion of the hub and shaft of the wheel of FIG. 1, and is used to illustrate the prior art problem of ratcheting.

FIG. 2 is intended to illustrate, in somewhat exaggerated fashion, the ratcheting phenomenon. It will be assumed that the hub 20 is subject to a large thermal transient which can occur when the wheel has been out of service and is at ambient temperatures and is then operated to move hot combustion gases. The wheel will heat up more quickly than the shaft 10. Because of the coefficient of expansion of the hub, it will tend to grow in both a radial and an axial direction with the dash line 28 illustrating the growth in exaggerated form. For purposes of this example it will be assumed that the foot 26 of the hub remains stationary during the expansion while the foot 24 is that which slips relative to the shaft. It will be appreciated that the radial force from the shrink fit coupled with the coefficient of friction between the foot 24 and shaft 10 provides the force resisting the axial expansion along the shaft of the foot 24. If the axial shear force in the hub exceeds this resisting force, the hub will move as to the dash line 28 position. Thus the most significant parameters involved in the slipping of the hub relative to the shaft are (a) the relative magnitudes of the shear stresses and normal stresses at the inner face, and (b) how their ratio compares to the coefficient of friction at that surface. Thus, mechanical method of controlling the relative magnitudes of the shears and normal stress can eliminate or at least reduce the problem of shrunk-on component ratcheting.

Figure 3:
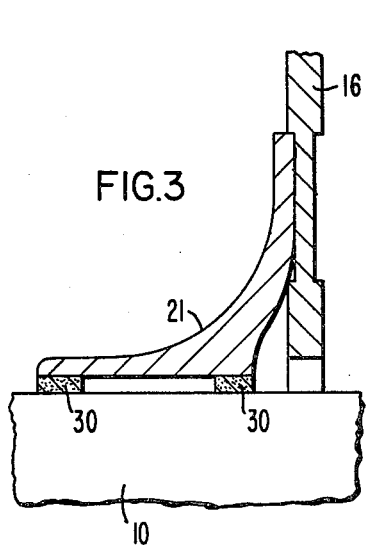
FIG. 3 is a view similar to FIG. 2 but showing the sleeve elements of the invention in place between the hub and shaft.

The arrangement for accomplishing this in accordance with the invention is somewhat schematically shown in FIG. 3 as comprising shrink fit sleeve elements 30 interposed between the shrunk-on component 21 and the shaft 10. However, each sleeve or ring 30 is not simply any ordinary sleeve, but rather is designed to have flexibilities in the axial, radial, and circumferential directions, including shear flexibilities, which control the magnitudes of the stresses as well as the relative magnitudes of the shear and normal stress and, so, can control the mechanisms causing component ratcheting. Additionally, in some instances the sleeves may be useful to adjust natural frequencies, reduce shrink fit stress, and reduce shrink-fit tolerance. Flexibility is used herein, as in its common usage, as the inverse of stiffness.

One way of carrying out the invention is to make the shrink fit pad 30 more flexible when submitted to axial shear stress at the contact interfaces with both the shaft 10 and the hub 20 than the actual shear stress of the hub itself. The sleeve 30 has the effect of relieving the interface axial shear stress, regardless of whether the radial or normal flexibility remains the same as that of the hub. Since slipping occurs when the axial shear stress at the interface is too large for friction to support, the reduction of the axial shear stress reduces slipping and as a consequence reduces ratcheting. For any given geometry and expected loading, the sleeve is designed to be flexible enough under axial shear stress to relieve those axial shear stresses enough that axial slipping is completely eliminated. One arrangement for reducing slipping and considered adequate in some circumstances, is by uniformly decreasing, as compared to the original hub, the flexibilities in all of the directions. The design of a sleeve for a given machine should consider the factors of the amount of differential expansion that must be absorbed, the cross effects of the sleeves on temperature distribution (since some types of sleeves would significantly increase temperature differences and hence, differential thermal expansion), and the effect of the sleeve on vibration characteristics.

Figure 4:
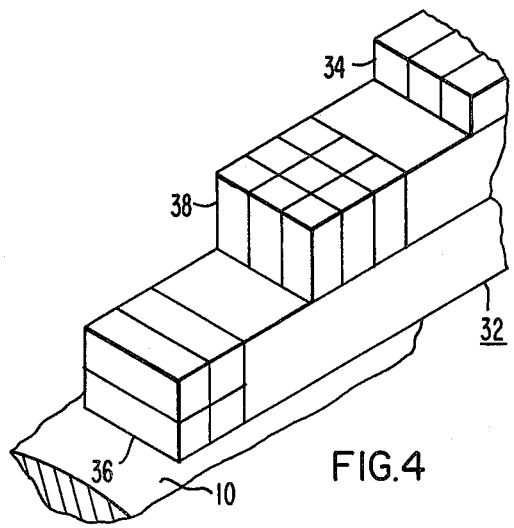
FIG. 4 is a schematic representation of an anisotropic composite material of the character which can be used to form one kind of sleeve.

FIG. 4 is a schematic illustration of a composite material comprising reinforcing elements in a matrix 32. The number of reinforcing elements shown are intended to represent the degree of stiffness in the given direction, and inversely the flexibility. Thus the three elements 34 extending in the axial direction provide greater flexibility than the four elements 36 extending in the circumferential direction, and they in turn provide greater flexibility than the six elements 38 extending in the radial direction. As noted, the illustration is schematic and the actual appearance of such a composite would be very different.

Figure 5:
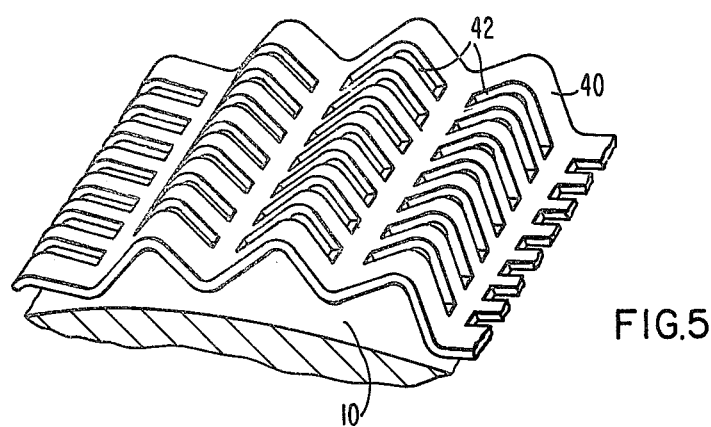
FIG. 5 is a fragmentary portion of a sleeve which has the required properties according to the invention obtained through the geometry of the sleeve.

Another way in which the invention can be carried out is by the provision of a sleeve which through geometrical shaping is designed to have adequate flexibility in the axial direction to avoid the slipping while also having the requisite radial and circumferential flexibilities. In FIG. 5, one geometric form is that of a corrugated ring 40 provided with slits 42 in portions thereof so that the desired flexibilities are obtained.

Figure 6:
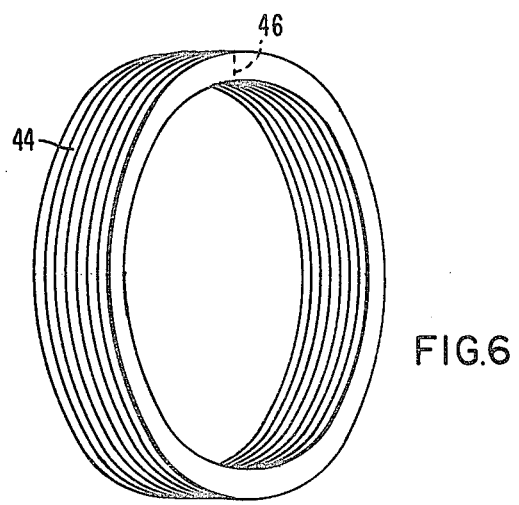
FIG. 6 is an isometric view of another form which the sleeve may take and, as in FIG. 5, is provided with the properties through the shape.

Another geometric form is shown in FIG. 6 in which a large number of thin steel rings 44 formed into an assembly comprise the sleeve. These rings may be individual rings brought together in laminated form or, in an alternative arrangement, may comprise a single steel spiral as indicated by the end of the sleeve having the dash line representation 46 indicating the end of the spiral.

Figure 7:
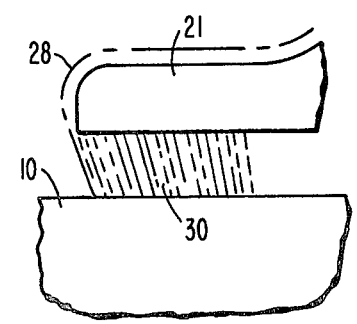
FIG. 7 is a view of a fragmentary portion of the hub and shaft and illustrating how the invention gives the desired result.

FIG. 7 is a schematic representation similar to FIG. 2 illustrating how slipping is avoided with an arrangement according to the invention because of the high axial shear flexibility which shows how the hub 21 can expand axially to the dash line position 28 with no slipping at the interfaces.

As now contemplated, the currently preferred arrangement will have a relatively heavy shrink fit of the hub 21 on the sleeves 30, with a somewhat lighter shrink fit between the sleeves 30 and the shaft 10.

We claim:

1. For large apparatus including a radial outer rotatable element driven by and encompassing a rotating shaft, and adapted for operation in an environment subject to severe cyclic loading occasioned by large speed changes and/or large thermal transients, an improvement for reducing ratcheting of the driven element relative to said shaft, comprising:
   an intermediate sleeve element between said outer driven element and said shaft, said outer driven element being heat shrunk on said sleeve, said sleeve having a greater flexibility in at least an axial direction than in a radial direction.

2. For apparatus according to claim 1 wherein:
said sleeve comprises a composite material of reinforcing elements and a matrix.

3. For apparatus according to claim 2 wherein:
said reinforcing elements provide a greater degree of flexibility in an axial direction than in a circumferential direction, and a greater degree of flexibility in the circumferential direction than in a radial direction.

4. For apparatus according to claim 1 wherein:
said sleeve comprises a lamina of metal rings encircling said shaft.

5. For apparatus according to claim 4 wherein:
said lamina of rings comprise a spiral.

6. For apparatus according to claim 1 wherein:
said sleeve comprises a slitted, corrugated ring.

7. For large apparatus including a radial outer rotatable element driven by and encompassing a rotating shaft, and adapted for operation in an environment subject to severe cyclic loading occasioned by large speed changes and/or large thermal transients, an improvement for reducing ratcheting of the driven element relative to said shaft, comprising:
an intermediate sleeve element between said outer driven element and said shaft, said outer driven element being heat shrunk on said sleeve, said sleeve having a greater flexibility in at least an axial direction than the flexibility of the outer rotatable driven element in an axial direction.

* * * * *